A. NAKRASCHOFSKY & M. LEONHARDT.
HORSE DETACHER.
APPLICATION FILED SEPT. 2, 1908.
929,975.
Patented Aug. 3, 1909.
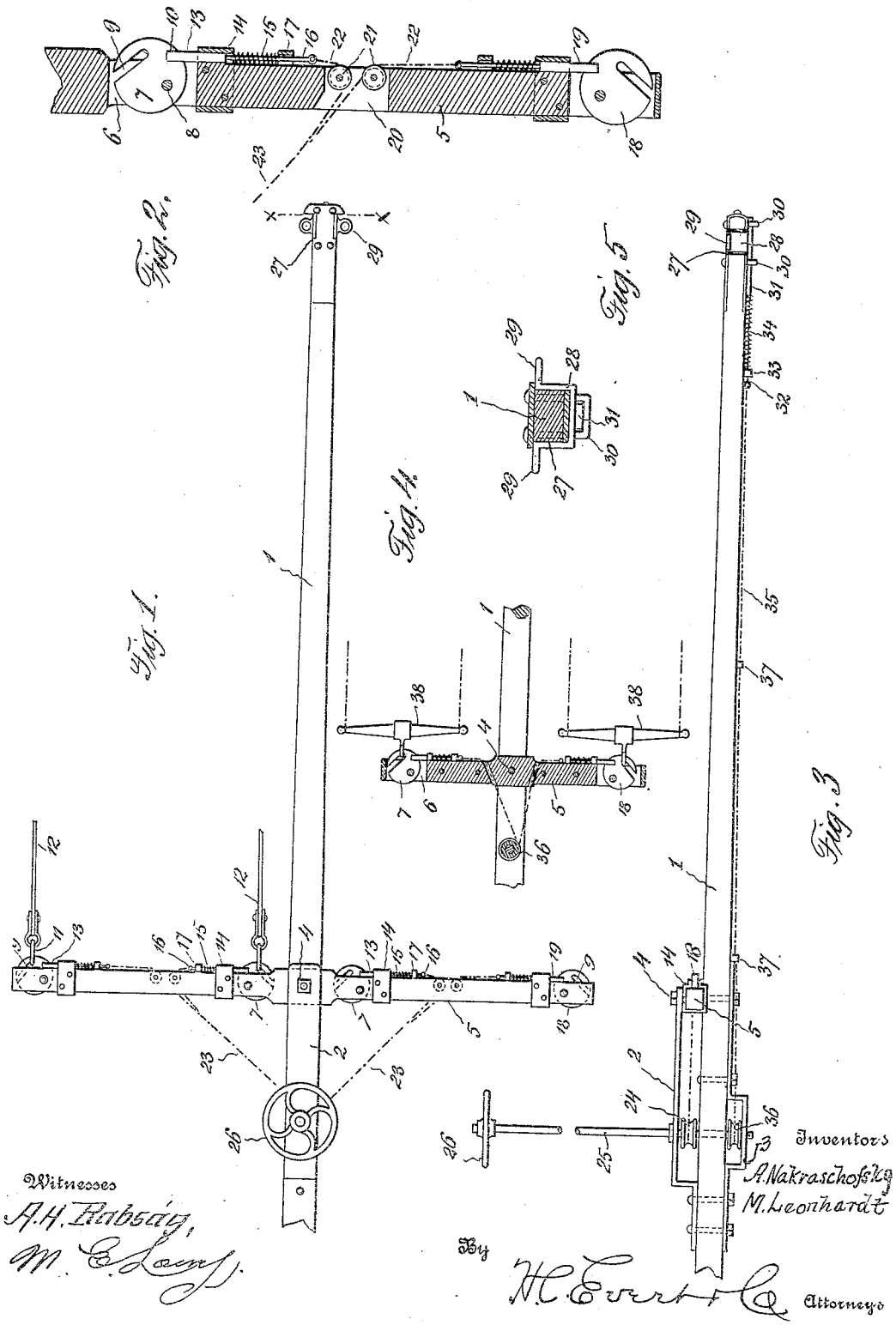

UNITED STATES PATENT OFFICE.

AUGUST NAKRASCHOFSKY AND MARTIN LEONHARDT, OF McKEES ROCKS, PENNSYLVANIA.

HORSE-DETACHER.

No. 929,975.  Specification of Letters Patent.  Patented Aug. 3, 1909.

Application filed September 2, 1908.  Serial No. 451,367.

*To all whom it may concern:*

Be it known that we, AUGUST NAKRASCHOFSKY and MARTIN LEONHARDT, citizens of the United States of America, residing at McKees Rocks, in the county of Allegheny and State of Pennsylvania, have invented certain new and useful Improvements in Horse-Detachers, of which the following is a specification, reference being had therein to the accompanying drawing.

This invention relates to horse detachers, and the object of our invention is the provision of a simple and effective means in connection with a vehicle tongue for releasing the traces or tugs and the backing straps of harness hinged to the vehicle, whereby excited and runaway horses can depart without injuring the vehicle, or the occupants thereof.

Our horse detacher is constructed to be used in connection with swingle trees, or as a double tree, to which the traces or tugs can be detachably connected. These traces or tugs are easily released from the driver's seat of a vehicle, but are positively held and prevented from accidental disengagement when a load is being drawn by a team hitched to the vehicle. The detacher besides being used in a case of emergency is also used when unhitching a team, and can be advantageously used in connection with fire apparatus, for the harness is always attached to the apparatus and only detached when the apparatus is being used at a fire.

Our invention will be hereinafter described in detail and specifically claimed.

In the drawings, Figure 1 is a plan of a vehicle tongue equipped with our detacher, Fig. 2 is an enlarged horizontal sectional view of a portion of the detacher, Fig. 3 is a side elevation of the vehicle tongue constructed in accordance with our invention, Fig. 4 is a plan of a portion of the tongue partly broken away and partly in section illustrating the modification of our invention, and Fig. 5 is an enlarged cross sectional view taken on the line $x$—$x$ of Fig. 1.

In the accompanying drawings 1 designates a vehicle tongue provided with brackets 2 and 3, the bracket 2 being located upon the upper side of the tongue and the bracket 3 upon the lower side thereof. Pivotally mounted between the bracket 2 and the tongue 1 by a bolt 4 is a double tree 5, said double tree adjacent to the tongue having horizontal slots 6 formed therein for eccentrically mounted disks 7, said disks being pivotally held by pins 8. The disks are provided with tangentially disposed slots 9 and with peripheral notches 10, the former receiving a ring 11 of a tug or trace 12, while the latter receives a latch 13 movably mounted in the strap 14 secured to the double tree. The latch 13 is normally held in engagement with the eccentric disk 7 by a coil spring 15 surrounding the rod 16 fixed to the latch, said rod being guided by a staple 17 carried by the double tree. The coil spring has one end thereof connected to the staple 17, while the opposite end is connected to the rod 16.

The outer ends of the double tree are provided with eccentric disks 18 similar to the disks 7, said disks being located in a fixed position by latches 19 similar to the latches 13. The double tree intermittent the disks 7 and 18 is slotted, as at 20 and in said slot is journaled two sheaves 21 over which ride cables 22 that are connected to the rods 16 of the latches 13 and 19. The cables 22 are connected to the cables 23, which are attached to a sheave 24, mounted upon a vertical shaft 25, journaled in the brackets 2 and 3. The shaft 25 extends upwardly to the driver's seat of a vehicle, (not shown) and is provided with a hand wheel 26.

The forward end of the tongue 1 is cut away, as at 27 to accommodate a yoke 28 having diametrically opposed apertured lugs 29, to which back straps, (not shown) are attached. The tongue adjacent to the cut away portion 27 is provided with depending staples 30 having a latch 31 employed for holding the yoke 28 in the cut away portion of the tongue. The latch 31 is provided with a rearwardly extending rod 32 guided by a staple 33. Encircling the rod 32 between the staple 33 and the latch 31 is a compression spring 34 for normally holding the latch in the staples 30.

Attached to the rod 32 and extending rearwardly beneath the tongue 1 is a cable 35, said cable being attached to a sheave 36 mounted upon the vertical shaft 25. The tongue 1 is provided with depending staples 37, for supporting the cable 35 between the sheaves 36 and the rod 32.

As shown in Fig. 1, tugs or traces can be connected to the double tree and should it be desired to use swingle trees 38, two of the eccentric disks 7 can be dispensed with as shown in Fig. 4 of the drawings.

To operate the horse detacher and release a team of horses connected to the tongue 1, the shaft 25 is rotated to wind the cables 23 and 35 upon the sheaves 24 and 36. The latches 13, 19 and 31 will be immediately removed to release the disks 7 and 18, and the yoke 28. When the latches 13 and 19 are moved out of engagement with the disks 7 and 18, said disks are partially rotated to allow the rings 11 to slip out of engagement with the disks. When the shaft 25 is released, the latches 13, 19 and 31 are returned to their normal position, the latches 13 and 19 impinging the edges of the disks 7 and 18, until said disks are turned to permit of said latches engaging in the peripheral notches thereof.

Our invention is applicable to buggies and light vehicles by providing the connecting bar of a pair of shafts with a single disk to which a swingle tree can be detachably connected.

While in the drawings forming a part of this application there is illustrated the preferred embodiments of our invention, we would have it understood that the structural elements of our invention can be varied or changed without departing from the spirit of the invention.

Having now described our invention what we claim as new, is;—

In a horse detacher, the combination with a tongue and a double-tree carried thereby, of circular disks arranged in said tree and eccentrically mounted upon vertical pivots in said double-tree, each of said disks formed with a forwardly extending slot inclining inwardly, each of said disks furthermore provided with a transversely extending notch in alinement with the inner end of said slot, said slots adapted to receive trace rings, spring held latches carried by the tree and engaging in said notches to prevent the shifting of the disks, a vertical shaft revolubly supported by the tongue, flexible means winding upon the shaft and connected with the latches for shifting them out of engagement with the disks, a yoke mounted at the forward end of said tongue, a spring held latch for normally holding said yoke in engagement with said tongue, and a cable winding upon said shaft for actuating the yoke latch to release the yoke simultaneously with the releasing of said disk.

In testimony whereof we affix our signatures in the presence of two witnesses.

AUGUST NAKRASCHOFSKY.
MARTIN LEONHARDT.

Witnesses:
A. N. Rabság,
Max H. Srolovitz.